UNITED STATES PATENT OFFICE

JOHANN JOSEPH STÖCKLY AND RICHARD BARTUNEK, OF TELTOW, NEAR BERLIN, GERMANY, ASSIGNORS TO THE FIRM VEREINIGTE GLANZSTOFF-FABRIKEN A-G., OF ELBERFELD, GERMANY

PROCESS FOR THE SEPARATION OF SODIUM SULPHATE FROM SULPHURIC ACID

No Drawing. Application filed October 10, 1928, Serial No. 311,707, and in Germany October 13, 1927.

In the manufacture of artificial silk, particularly viscose silk, in which comparatively concentrated sulphuric acid baths are used as spinning baths, difficulty is encountered by reason of the fact that the sodium sulphate produced in the interchange of the acid with the alkali of the viscose is soluble only to a comparatively small extent in concentrated sulphuric acids, at ordinary temperature, so that the formation of crystals is very liable to take place in the spinning baths. Such crystals, formed in the spinning bath interfere very seriously with the formation of the thread and the inconvenience becomes particularly manifest when such baths are used in a cycle for the revivification or recovery of the acids in a concentrated state.

It is an object of the present invention to provide a process for separating sodium sulphate from sulphuric acid and a further object is to provide an improved treatment for sulphuric acid baths employed in the manufacture of viscose silk. In carrying out the invention the sulphuric acid baths containing the salts are concentrated by heat, cooled down in the concentrated state to the temperature at which they are to be used, for instance, ordinary room temperature and the masses of salt which separate out removed from the acid. It has been found that the ease and thoroughness with which the salt can be separated out is influenced by the degree of concentration to which the acid is brought prior to the separation of the salt, the coefficient of solubility of the sulphuric acid for sodium sulphate having a minimum value in the region of relatively high concentrations. The proportions are indicated in the accompanying table, showing the number of grammes of sodium sulphate per litre of solution at different sulphuric acid concentrations and different temperatures:—

| $H_2SO_4$ | Degrees Cels. | | | | | | |
|---|---|---|---|---|---|---|---|
| Per Cent | 0 | 5 | 10 | 15 | 20 | 40 | 80 |
| 30 | 260 | | | | 354 | 385 | 421 |
| 50 | 110 | | | | 140 | 223 | 310 |
| 65 | | 50 | 83 | 61 | 47 | | |
| 70 | 34 | 20 | 17 | 28 | 33 | 117 | 173 |
| 75 | | 6 | 6 | 10 | 4 | 31 | 86 |
| 80 | | 19 | 5 | 6 | 7 | 18 | 267 |
| 85 | 20 | 19 | 20 | 9 | 20 | 37 | 200 |
| 90 | | | 26 | 34 | 29 | 51 | |
| 98 | 65 | | | | 97 | 246 | 447 |

As will be seen from the table this minimum of solubility lies at a concentration of the sulphuric acid of from 75 to 80% and is also dependent on the temperature.

The practical application of these conditions is as follows:—The salt containing sulphuric acid is brought, by evaporation to that degree of concentration at which its coefficient of solubility for sodium sulphate will have the lowest value when it is cooled down again. The hot acid at the appropriate concentration and containing the salt but, as yet, free from crystals is then cooled to the required temperature (for instance, room temperature) whereupon practically all the sodium sulphate is deposited, and can then be separated out in any suitable manner. It has been found preferable in concentrating the acid to push the degree of concentration up to about 70–80%. According to the results set out above the most favourable concentration lay in the region of 75–80% sulphuric acid content. Very thorough deposition of the salt is possible if cooling is carried at least down to a temperature of 40° C. but preferably to room temperature or lower.

It has also been observed that such sulphuric acid-sodium sulphate mixtures exhibit to an unusually marked degree the so-called supersaturation effect. For instance, it was found that 78% sulphuric acid containing rather more than 30 g. sodium sulphate could be cooled down to 15° C. without the salt crystallizing out. When, however, the same solution was cooled down from 80° C. with continuous addition of small inoculation crystals the salt began to separate out even at 50° C. According to the invention, therefore, provision is made for assisting the separation of the salt by the addition of inoculation crystals.

It has also been found that in the cooling down of the sulphuric acids referred to, even when they contain only comparatively little sodium sulphate, e. g. 30 to 35 grammes per litre, very large quantities of voluminous crystal masses separate out filling the half or the whole volume of the acid. These masses of crystals cannot be separated by simple deposition or by ordinary filtration from the acid in a rational way. On the contrary, the crystalline masses have to be condensed and the acid expelled from them by pressure and it has been found that the separation can most conveniently be effected by centrifugal extraction or by filtration under a vacuum or under pressure. The masses of crystals separated contain more or less acid according to the mode and nature of the separation. Thus, for example, vacuum filtration yielded a comparatively dry mass of crystals containing 67% of sulphuric acid, 17% of sodium sulphate and 16% of water. Such masses of crystals represent a sulphuric acid of relatively high salt content and with little water. They are admirably suitable for the preparation of spinning baths according to the Muller process or improvements thereon. The masses of crystals may also be subjected to an evaporating process in suitable roasting furnaces for the manufacture of sulphuric acid or the resuscitation of sulphuric acid or of sulphuric acid spinning baths.

Example

Let a spinning bath for viscose be assumed to consist substantially of 70% sulphuric acid. By the alkali of the viscose it becomes enriched with sodium sulphate and simultaneously diluted, according to the composition of the viscose, by the addition of the water therefrom. In order to resuscitate the spinning bath thus becoming diluted it is concentrated either in portions or continuously, in suitable concentrating apparatus to a content of 78% $H_2SO_4$. The concentrated salt containing liquid is now cooled down with the necessary stirring and with the addition of inoculating crystals to 15° C., whereupon the aforesaid masses of crystals separate out. The masses of crystals are separated from the sulphuric acid by vacuum filtration. The filtrate obtained, that is to say, the acid which still has a concentration of nearly 78% is used for the revivification of the spinning bath. The more or less dry crystals may be worked up in one or other of the ways above referred to.

We claim:

1. For the separation of sodium sulphate from sulphuric acid, the process consisting in concentrating the salt-containing sulphuric acid by evaporation to a concentration of 70–85% at which the acid, when cooled to ordinary temperature will possess the lowest coefficient of solubility for sodium sulphate, setting up crystallization and separating the acid from the masses of salt crystallized out.

2. For the separation of sodium sulphate from sulphuric acid, the process consisting in concentrating the salt-containing sulphuric acid by evaporation to a concentration of 70–85% at which the acid, when cooled to ordinary temperature will possess the lowest coefficient of solubility for sodium sulphate, setting up crystallization by cooling down, stirring and separating the acid from the masses of salt crystallized out.

3. For the separation of sodium sulphate from sulphuric acid, the process consisting in concentrating the salt-containing sulphuric acid by evaporation to a content of 70 to 85% sulphuric acid, cooling the liquor to a temperature lower than 40° C. and separating the acid from the masses of salt crystallized out.

4. For the separation of sodium sulphate from sulphuric acid, the process consisting in concentrating the salt-containing sulphuric acid by evaporation to a content of 70–85% sulphuric acid, cooling the liquor to a temperature below 40° C. while adding inoculating crystals and separating the acid from the masses of salt crystallized out.

5. For the separation of sodium sulphate from sulphuric acid, the process consisting in concentrating the salt-containing sulphuric acid by evaporation to a concentration of 70–85% at which the acid, when cooled to ordinary temperature will possess the lowest coefficient of solubility for sodium sulphate, setting up crystallization and treating the masses of crystals produced for the extraction therefrom of the sulphuric acid.

6. For the separation of sodium sulphate from sulphuric acid, the process consisting in concentrating the salt-containing sulphuric acid by evaporation to a concentration of 70–85% at which the acid, when cooled to ordinary temperature will possess the lowest coefficient of solubility for sodium sulphate, setting up crystallization and separating the acid from the masses of crystals produced by filtration under a vacuum.

7. For the separation of sodium sulphate from sulphuric acid, the process consisting in concentrating the salt-containing sulphuric acid by evaporation to a concentation of 70–85% at which the acid, when cooled to ordinary temperature will possess the lowest coefficient of solubility for sodium sulphate, setting up crystallization and centrifuging the masses of crystals produced for the extraction therefrom of the sulphuric acid.

8. For the separation of sodium sulphate from sulphuric acid, the process consisting in concentrating the salt-containing sulphuric acid by evaporation to a concentration of 70–85% at which the acid, when cooled to ordinary temperature will possess the lowest coefficient of solubility for sodium sulphate, setting up crystallization and filtering the resulting mixture of crystalline masses and sulphuric acid under pressure for the extraction of the acid from the crystals.

9. For the separation of sodium sulphate from sulphuric acid, the process consisting in concentrating the salt-containing sulphuric acid by evaporation to a content of 70–85% sulphuric acid, cooling the liquor to a temperature lower than 40° C. while adding inoculating crystals and separating the acid from the masses of crystals produced by vacuum filtration.

10. A method of revivifying a spinning bath for viscose which has become diluted by the sodium hydroxide of the viscose precipitated therein, which comprises concentrating the spinning bath to a sulphuric acid content of approximately 78%, cooling the bath down to 15° C. while stirring and adding inoculating crystals, and then separating the acid from the masses of crystals produced.

In testimony that we claim the foregoing as our invention, we have signed our names.

Dr. JOHANN JOSEPH STÖCKLY.
Dr. Ing. RICHARD BARTUNEK.